United States Patent
Pabst et al.

(10) Patent No.: US 9,212,697 B2
(45) Date of Patent: Dec. 15, 2015

(54) RING ELEMENT, PARTICULARLY A RACE RING FOR A THRUST ROLLER BEARING

(75) Inventors: Alexander Pabst, Erlangen (DE);
Andreas Ziegler, Charlotte, NC (US);
Frank Beeck, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/450,783

(22) Filed: Apr. 19, 2012

(65) Prior Publication Data
US 2012/0269477 A1 Oct. 25, 2012

(30) Foreign Application Priority Data

Apr. 20, 2011 (DE) .................. 10 2011 007 798

(51) Int. Cl.
*F16C 19/30* (2006.01)
*F16C 33/58* (2006.01)
*F16C 19/46* (2006.01)

(52) U.S. Cl.
CPC .............. *F16C 33/58* (2013.01); *F16C 19/305* (2013.01); *F16C 19/463* (2013.01)

(58) Field of Classification Search
CPC ...... F16C 33/58; F16C 33/581; F16C 33/583;
F16C 19/30; F16C 19/305; F16C 19/32;
F16C 19/44; F16C 19/46; F16C 19/463;
F16C 19/466; F16C 35/00; F16C 35/04;
F16C 35/042; F16C 35/06; F16C 35/067;
F16C 35/07; F16C 35/077

USPC ......... 384/618, 620, 621, 622, 609, 615, 617, 384/590, 600, 107, 118
See application file for complete search history.

(56) References Cited

U.S. PATENT DOCUMENTS

| | | | |
|---|---|---|---|
| 6,658,955 B1 | 12/2003 | Fuhrer et al. | |
| RE39,695 E * | 6/2007 | Ungchusri et al. | 285/276 |
| RE40,313 E * | 5/2008 | Axler et al. | 384/620 |
| 7,775,724 B2 * | 8/2010 | Brown et al. | 384/597 |
| 2010/0209183 A1 * | 8/2010 | Fugel et al. | 403/252 |

FOREIGN PATENT DOCUMENTS

| | | | | |
|---|---|---|---|---|
| DE | 2149555 | * | 4/1973 | ........ F16C 35/06 |
| DE | 2621447 A1 | | 8/1977 | |
| DE | 4409734 A1 * | | 1/1995 | ........ F16C 33/66 |
| DE | 10 2007 023 953 A1 | | 11/2008 | |
| FR | 2136262 | * | 12/1972 | ........ F16C 19/30 |

OTHER PUBLICATIONS

Translation of DE 4409734, obtained Jul. 25, 2014.*
Translation of FR 2136262, obtained Jan. 29, 2015.*
Translation of DE 2149555, obtained Jan. 29, 2015.*
Translation of Claims of DE 4409734, obtained Jan. 29, 2015.*

* cited by examiner

*Primary Examiner* — Richard W Ridley
*Assistant Examiner* — Brian McGovern
(74) *Attorney, Agent, or Firm* — Simpson & Simpson, PLLC

(57) ABSTRACT

A ring element, particularly a thrust bearing race ring, which has a peripheral wall, through which a radial load exerting an interference fit occurs. The peripheral wall is configured such that it forms zones with a large overlap and zones with a reduced overlap that succeed each other in a peripheral direction.

7 Claims, 2 Drawing Sheets

RING ELEMENT, PARTICULARLY A RACE RING FOR A THRUST ROLLER BEARING

CROSS-REFERENCE TO RELATED APPLICATION

This application claims the priority of DE 10 2011 007 798.7 filed Apr. 20, 2011, which is incorporated by reference herein.

FIELD OF THE INVENTION

The invention relates to a ring element, which has a ring body, a first ring front end face formed by the ring body and directed substantially in radial direction, an inner peripheral wall, and an outer peripheral wall. At least one of the inner and outer peripheral walls forms a seating surface through which the ring element is retained in an installed state through an interference fit.

More specifically, the invention is directed to a ring element that forms a race ring for a thrust needle roller bearing. The substantially radially directed first ring front end face functions as a rolling element running surface and the race ring is secured in the installed state by a radial interference fit of the outer peripheral wall.

BACKGROUND OF THE INVENTION

DE 26 21 447 A1 discloses a transmission device in which a transmission of axial force is realized through a thrust needle roller bearing. The thrust needle roller bearing comprises a relatively solid race ring that is seated in an annular groove of an annular piston. A plurality of cylindrical rolling elements are in roiling contact on this race ring (See, DE 26 21 447, FIG. 1 reference numeral 146). These rolling elements are supported in axial direction on their side turned away from the race ring by a second, relatively thin-walled race ring.

U.S. Pat. No. 6,658,955 B1 discloses a transmission construction comprising two thrust hearings configured as needle roller bearings. Both of these thrust bearings comprise relatively solid (i.e., thick-walled) race ring, with plane parallel ground front end faces on both sides.

DE 10 2007 023 953 A1 discloses a transmission construction comprising a plurality of thrust bearings configured as needle roller bearings that comprise relatively thin-walled race rings that are however substantially supported all-over in an axial direction. The race rings comprise a partial annular web through which the race rings are centered in a radial direction. One of the annular webs is configured with detent jaws through which the associated race ring is additionally secured in the axial direction.

Transmission devices, particularly automatic transmissions, have the problem that, due to the generally desired, highly compact structure, only a limited design space is available for fixing and securing elements. In many cases, therefore, elements of the transmission are arranged so that they are secured in their operating position substantially only under the action of applied operational forces and through an adequate interference fit. A problem in the realization of interference fits for securing bearing structures is that requirements for the component tolerances are high because, in the case of slight geometric overlap of the interference fit, no adequate securing action is produced or, with large overlap, the components are disadvantageously loaded through excessive pressing forces.

SUMMARY OF THE INVENTION

The invention is directed to create solutions through which it becomes possible, in the framework of the installation of ring elements, particularly ring elements that function as thrust hearing race rings, to guarantee a secure interference fit of the components without exposing these ring elements to disadvantageous loading.

Broadly, the invention relates to a ring element which comprises a ring body, a first ring front end face formed by the ring body and directed substantially in radial direction, an inner peripheral wall, and an outer peripheral wall. At least one of the inner and outer peripheral walls forms a seating surface through which the ring element is retained in a radial direction in an installed state through an interference fit exerting a radial load. The peripheral wall that exerts the radial load possesses, over the course of its extension in a peripheral direction, variable radial distances from the center of the ring body such that the peripheral wall forms zones with a large interference fit and zones without or with reduced overlap that succeed one another in the peripheral direction.

In this way, it becomes advantageously possible to realize with the ring element itself, a component in which, with lower requirements on the shape and dimensional tolerances of the counter component, a secure interference fit is guaranteed and it is additionally assured that any excessive overlaps can be compensated through a defined elastic component deformation of the ring element without occurrence of impermissibly high contact pressure in the region of the interference fit zones and without axial vaulting or tilting of the ring element in the region of the front end face.

The peripheral wall through which the interference fit is realized is preferably configured as a polygonal wall. The shape of the polygonal wall is preferably determined by a structural-mechanical calculation or by empirical methods such that the ring element, under the influence of the dimensioned interference fit which retains or achieves the required functional geometry. The peripheral wall can further be configured so as to need an adequate fine finishing only in the region of the zones involved in the realization of the interference fit, and the valleys situated between these interference fit zones have a different, particularly, lower surface quality. Preferably, however, even the zones subjected to lower radial loading (i.e., the valley zones are configured so as to come to bear against the surrounding structure in the installed state and thus contribute to the support of the components as well as to achieving and maintaining an advantageous functional geometry of the ring element.

Preferably, the peripheral wall through which the interference fit is realized is configured as a polygonal wall that forms three valleys and three peaks. In this configuration of the peripheral wall comprising three radially vaulted peak zones, these zones are preferably arranged uniformly spaced in peripheral direction behind one another. The forces introduced through the interference fit zones are taken up in the ring element. In the region of the peak zones, the ring element can yield elastically slightly in the radial direction under the influence of the pressing forces. At the same time, the ring element can vault in the radial direction in the region of the valley zones. Preferably, the elevations of the peak zones, the deflections of the valley zones and the transition regions between the peak and the valley zones are configured such that the valley zones come to hear against the surrounding geometry when a maximal permissible radial pressing has been reached.

The polygonal geometry can be determined advantageously in such a manner that, under the action of the expected pressing forces, the ring body attains a substantially cylindrical geometry in the region of the interference fit surface and, preferably, also the region of its inner wall.

The ring body is preferably configured as a stepped ring and comprises, in the region of its outer peripheral wall, a first annular step with a large outer diameter and a second annular step with a smaller outer diameter. The polygonal contour described above may be realized only on one of the annular steps, particularly on the annular step with the largest outer diameter. It is also possible to realize the polygonal contour on both annular steps under the condition that the radially vaulting peak zones and the radially deflecting valley zones of both the annular steps are each situated in the same angular segment. In this way, it is achieved that both annular steps deflect and vault in the same angular zones and that these bracing mechanisms do not block each other.

The ring element of the invention can be used particularly for securing a spring ring. For this purpose, an annular step, particularly a third annular step can be configured on the ring element. Through this third annular step, an annular space can be formed that enables the ring element to be pushed partially into the spring ring. This region pushed into the spring ring engages and thus secures the spring ring.

The ring element is preferably dimensioned such that its component depth measured in the axial direction corresponds approximately to 0.5 to 1.1 times the ring width dimension measured in radial direction. In this way, the ring width dimension corresponds approximately to 0.15 to 0.3 times the inner diameter of the ring element.

The ring element is made preferably out of a steel material. The ring element can be configured particularly as a race ring for a thrust bearing. The first front end face of the ring element turned towards the rolling elements of this thrust bearing functions as a running surface. It is particularly advantageous to make this running surface as a ground surface. Grinding of the race ring can be realized by tensioning the ring element through installation-typical pressure. In this way, the running surface attains it ideal geometry in the installed state of the ring element.

In the installed state, the ring element according to the invention forms part of an interference fit in which the introduction of the radial pressing forces into the ring element is effected in a plurality of peripherally equally spaced interference fit zones that result from the slight radial elevations of the peripheral wall of the ring element. It is possible to configure the surrounding structure such that those regions of the surrounding structure in which the radially salient peripheral wall zones will be seated possess an enhanced rigidity. This enhanced rigidity can be realized, for example, through struts or wall thickenings.

BRIEF DESCRIPTION OF THE DRAWINGS

Further details and features of the invention result from the following description made with reference to the drawing.

DETAILED DESCRIPTION OF THE INVENTION

Figure 1:
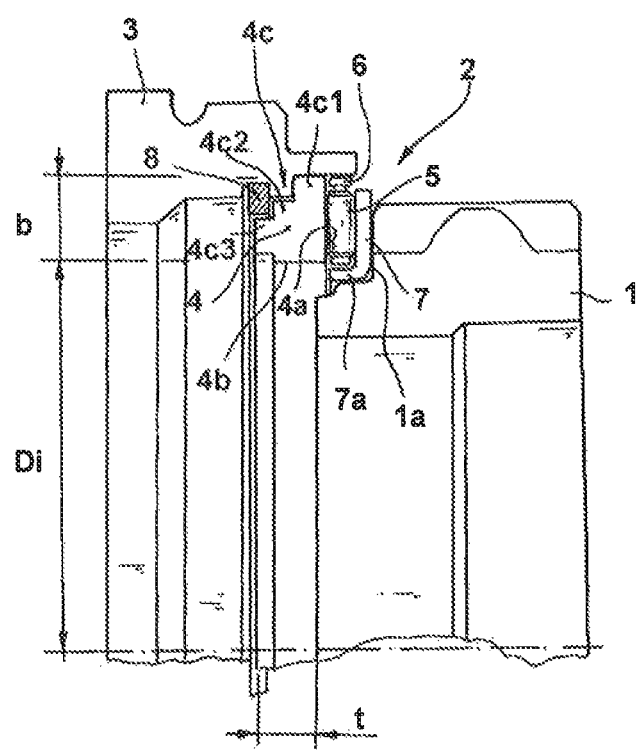
FIG. 1 shows an axial sectional representation for elucidating the structure of a ring element according to the invention as part of a rolling bearing for a transmission device.

FIG. 1 shows a component combination which is a constituent part of an automatic transmission, not specifically shown in the figure. This component combination comprises a gearwheel 1, which is supported through a thrust bearing 2 on a housing ring 3.

The thrust bearing 2 comprises a ring element 4, which is seated by a medium interference fit in the housing ring 3 and radially centered therein. The ring element 4 forms a running surface 4a for the rolling elements 5. The roiling elements 5 are configured as cylindrical or needle rollers and are guided in a cage 6.

Figure 2:
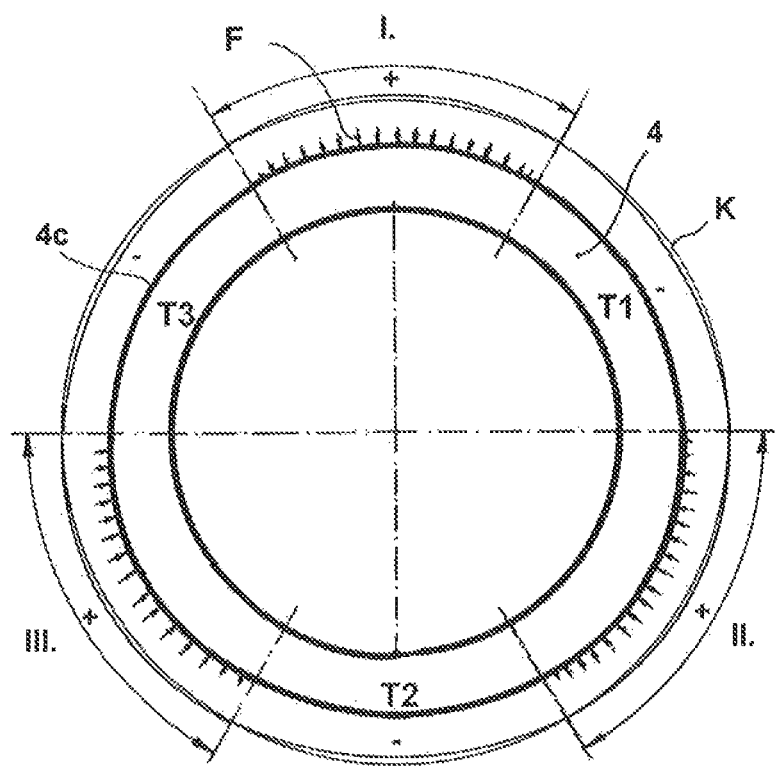
FIG. 2 shows a representation for explaining the contour design according to the invention for a ring element of the invention to be secured through a radial interference fit.

The thrust bearing 2 comprises a second race ring 7 that is configured as a relatively thin-walled component, particularly sheet metal shaped part. This second race ring 7 comprises an annular web 7a and is centered through an inner peripheral surface formed by the annular web 7a. The race ring 7 is seated with a hack surface turned away from the rolling elements 5 on an annular front end face 1a of the gearwheel 1 and on front end faces of the teeth of the gearwheel 1. As seen in FIG. 2, gearwheel 1 does not extend past the entirety of ring element 4 in an axial direction right to left in FIG. 2. As seen in FIG. 2, no portion of race ring 7 is located between housing 3 and rolling elements 5 in a radial direction (as an example, distance Di is in the radial direction). Cage 6 is located between rolling elements 5 and housing 3 in the radial direction.

In the present embodiment, the ring element 4 comprises a relatively solid ring body comprising a first ring front end face Which is substantially directed in radial direction and which, as already mentioned, functions in the present example of embodiment as a running surface 4a. The ring element 4 further forms an inner peripheral wall 4b and an outer peripheral wall 4c with a stepped configuration in the present case. The outer peripheral wall 4c forms a seating surface through which the ring element 4 is radially supported in the installed state in an interference fit that exerts a radial load. The ring element 4, as well as the interference fit realized with use of the ring element 4, is characterized by the fact that the seating surface of the peripheral wall 4c, through which the radially loading interference fit is achieved, is configured as a polygonal wall.

As will be explained more closely particularly with reference to FIG. 2, the polygonal wall is configured so as to form at least three "valleys" and three "peaks." These peaks are formed by zones that vault slightly in the radial direction. The valleys correspond to the regions situated between these vaulting zones. The polygonal geometry of the peripheral wall 4c is determined so that, under the action of the expected pressing forces in the region of the interference fit surface 4c1, the ring body attains a substantially cylindrical geometry.

In the present embodiment, the ring body is, for example, configured as a stepped ring and forms, in the region of its outer peripheral wall 4c, a first annular step 4c1 which has a large outer diameter and a second annular step 4c2 that has a smaller outer diameter. In the present embodiment, only one of the annular steps has a polygonal contour, which, in this case, is on the first annular step 4c1.

Moreover, as third annular step 4c3 is likewise configured on the ring body. The third annular step 4c3 forms a securing structure which, in the installed state of the ring element 4 shown in the figure, engages a spring ring 8 in axial direction and thus secures this spring ring.

The ring element 4 in this embodiment is dimensioned such that its component depth t measured in the axial direction corresponds approximately to 0.3 to 1.1 times the ring width dimension b measured in the radial direction. The ring width dimension b corresponds, in this case, approximately to 0.15 to 0.3 times the inner diameter Di of the ring element 4.

FIG. 2 is a simplified view of the ring element 4 showing a peripheral wall 4c schematically. However, any one or all of the steps 4c1, 4c2, 4c3, may have the features described below. As can be seen in FIG. 2, the ring element 4 can be configured so as to form three interference fit zones I, II, III which follow one another equally spaced in peripheral direction. Each of these interference fit zones I, II, III extends over an angular region of approximately 60°. These interference fit zones I, II, III are zones that, in conjunction with the reception geometry provided for receiving the ring element 4, possess a larger radial overlap than the valley zones T1, T2, T3 situated between said interference fit zones. The valley zones T1, T2, T3 may form fits in the transition region or, given the case, also provide no overlap.

The degree of overlap in the region of the interference fit zones I, II, III is matched to the permissible component loading and the required retaining force. The transition between the interference fit zones and the valley zones T1, T2, T3 is continuous. Under the action of the surface pressing forces F applied to the interference fit zones I, II, III, the ring element can vault slightly in the radial direction in the region of the valley zones T1, T2, T3 till those regions of the peripheral wall 4c that form the valley zones T1, T2, T3 come to bear against the reception wall of the counter geometry.

The ring element 4 according to the invention is particularly suitable for use as a bearing washer of a thrust needle roller bearing. The ring element 4 forms, preferably in the region of its outer peripheral wall, a plurality of axially succeeding steps. The peripheral wall of at least one of the steps is used as an interference fit surface. This peripheral wall is configured so as to comprise a characteristic polygonal or peak-and-valley shape on its outer diameter. In the angular segments marked with "+", the peripheral wall 4c rises above an enveloping circle K, in the angular segments marked with "−", the peripheral wall extends along or below the enveloping circle K. The oversize or undersize corresponds substantially to the overlaps matched to the component size for achieving a firm interference fit or a fit permitting slight movement.

The configuration of the step profile on the outer periphery makes it possible to realize further functions, such as, for instance, the securing of locking rings. Moreover, this also enables a saving of axial design space and of further securing components.

The configuration with the polygonal or polygon-like shape creates further advantages, particularly for assembly. Because the washer thus has only a partial overlap in three regions of the outer diameter in the housing (circular bore), relatively low pressing-in forces can be assured. Moreover, a slanting position of the ring element which would result with a circular outer diameter design is counteracted.

Through the inventive design of the cross-section of the ring element and its outer contour, a tilting of the ring element under the action of the pressing-in forces and, thus also, unfavorable running surface geometries can be avoided. Through the inventive cross-section design, a favorable position of the main axes of the surface moments of inertia of the ring cross-section is achieved and the force resulting from the overlap is limited. Through the polygonal shape, tilting can be advantageously prevented because the forces resulting from the overlap occur only partially and a defined by-pass is created. The micro finishing of the ring element can be restricted to the polygon-like outer peripheral surface and to any functional surfaces like, for instance, the running surface. The further surfaces can retain the surface qualities as created by any preceding production steps.

The invention claimed is:

1. A thrust bearing assembly, comprising:
    an axis;
    a housing having an inner periphery;
    a gearwheel;
    a first race ring;
        in contact with the inner periphery of the housing;
        located inward of the housing in a radial direction orthogonal to the axis; and, comprising:
            an outer peripheral wall including:
                a plurality of valleys; and,
                a plurality of peaks;
            an inner peripheral wall; and,
            a front end face:
                orthogonal to the axis and facing in a first axial direction parallel to the axis; and,
                connecting the outer peripheral wall and the inner peripheral wall;
    a second race ring in contact with the gearwheel and including a first end face orthogonal to the axis and facing a second axial direction, opposite the first axial direction; and,
    a plurality of cylindrical or needle rollers disposed between the front end face and the first end face in the first axial direction, wherein:
        the outer peripheral wall, includes:
            a first annular step:
                in contact with the housing; and,
                having a first outer diameter;
            a second annular step having a second outer diameter less than the first outer diameter; and,
            a third annular step:
                having a third outer diameter less than the second outer diameter; and,
        the first annular step includes the plurality of valleys and the plurality of peaks;
        at least a portion of the plurality of peaks is in contact with the housing;
        the plurality of peaks extend further from the axis in the radial direction, orthogonal to the axis, than the plurality of valleys; and,
        respective peaks from the plurality of peaks alternate, in a peripheral direction, with respective valleys from the plurality of valleys a spring ring engages the third annular step.

2. The thrust bearing assembly according to claim 1, wherein the pluralities of valleys and peaks approximate a polygonal wall in that the plurality of valleys represents sides of a polygon and the plurality of peaks represents corners of the polygon.

3. The thrust bearing assembly according to claim 2, wherein the polygonal wall includes at least three valleys and three peaks.

4. The thrust bearing assembly according to claim 1 wherein the plurality of valleys and the plurality of peaks are disposed on only one of the annular steps which approximates a polygonal contour in that the plurality of valleys represents sides of a polygon and the plurality of peaks represents corners of the polygon.

5. The thrust bearing assembly according to claim 4, wherein the first annular step has the polygonal contour.

6. The thrust bearing assembly according to claim 1, wherein the plurality of valleys and the plurality of peaks are disposed on both the first annular step and the second annular step, which approximate respective polygonal contours in that the respective pluralities of valleys represent respective sides of respective polygons and the respective pluralities of peaks represent respective corners of the respective polygons and the respective pluralities of valleys of both the first annular step and the second annular step are situated in common angular segments.

7. The thrust bearing assembly according to claim 1, wherein the first race ring is dimensioned to have a component depth measured in an axial direction that corresponds to 0.5 to 1.1 times a first race ring width dimension measured in a radial direction, the width dimension corresponding to 0.15 to 0.3 times an inner diameter of the first race ring.

* * * * *